United States Patent
Ge (10) Patent No.: US 10,807,001 B2
(45) Date of Patent: Oct. 20, 2020

(54) INFORMATION PROCESSING METHOD, APPARATUS AND COMPUTER READABLE STORAGE MEDIUM

(71) Applicant: NETEASE (HANGZHOU) NETWORK CO.,LTD., Hangzhou (CN)

(72) Inventor: Jin Ge, Hangzhou (CN)

(73) Assignee: NETEASE (HANGZHOU) NETWORK CO., LTD., Hangzhou, Zhejiang (CN)

(*) Notice: Subject to any disclaimer, the term of this patent is extended or adjusted under 35 U.S.C. 154(b) by 33 days.

(21) Appl. No.: 16/125,771

(22) Filed: Sep. 10, 2018

(65) Prior Publication Data

US 2019/0076739 A1    Mar. 14, 2019

(30) Foreign Application Priority Data

Sep. 12, 2017   (CN) .......................... 2017 1 0817315
Sep. 12, 2017   (CN) .......................... 2017 1 0818304

(51) Int. Cl.
*A63F 13/537*   (2014.01)
*A63F 13/216*   (2014.01)
(Continued)

(52) U.S. Cl.
CPC .......... *A63F 13/537* (2014.09); *A63F 13/216* (2014.09); *A63F 13/426* (2014.09);
(Continued)

(58) Field of Classification Search
None
See application file for complete search history.

(56) References Cited

U.S. PATENT DOCUMENTS

| 2002/0103031 A1* | 8/2002 | Neveu | A63F 13/06 |
| | | | 463/49 |
| 2007/0010325 A1* | 1/2007 | Suzuki | A63F 13/10 |
| | | | 463/31 |

(Continued)

FOREIGN PATENT DOCUMENTS

| CN | 104740876 A | 7/2015 |
| CN | 104784931 A | 7/2015 |

(Continued)

OTHER PUBLICATIONS http://fight.pcgames.com.cn/391/3914399_all.html.
(Continued)

*Primary Examiner* — Seng H Lim
(74) *Attorney, Agent, or Firm* — Yunling Ren (57) ABSTRACT

The present disclosure discloses an information processing method, apparatus, and computer readable storage medium for controlling transmission and presentation of interaction information between game terminals. A graphical user interface of the game terminal includes at least pan of game scene and a mini-map, and the method includes: acquiring a position information of a first virtual character in the game scene, by a first game terminal, and determining a direction information according to a preset direction determination rule; sending, by the first game terminal, the position information and the direction information to a second game terminal; and generating a graphical positioning mark in the mini-map on the graphical user interface of the second game terminal according to the position information and the direction information, wherein the graphical positioning mark comprises a position indicator for indicating the position information and a direction indicator for indicating the direction information.

27 Claims, 6 Drawing Sheets

(51) Int. Cl.
*A63F 13/426* (2014.01)
*A63F 13/847* (2014.01)
*A63F 13/5378* (2014.01)
*A63F 13/837* (2014.01)

(52) U.S. Cl.
CPC ........ *A63F 13/5378* (2014.09); *A63F 13/837* (2014.09); *A63F 13/847* (2014.09)

(56) References Cited

U.S. PATENT DOCUMENTS

| | | | | |
|---|---|---|---|---|
| 2007/0026944 A1* | 2/2007 | Maehiro | ................. | A63F 13/10 463/31 |
| 2009/0247250 A1* | 10/2009 | Kato | ................. | A63F 13/10 463/2 |
| 2011/0245942 A1* | 10/2011 | Yamamoto | ............ | A63F 13/803 700/91 |
| 2014/0121012 A1* | 5/2014 | Tagawa | .................. | A63F 13/06 463/31 |
| 2014/0188385 A1* | 7/2014 | McHale | .................. | F41G 1/473 701/523 |
| 2018/0104591 A1* | 4/2018 | Fukuda | ................. | A63F 13/211 |
| 2018/0229121 A1* | 8/2018 | Tokuchi | .................. | A63F 13/52 |

FOREIGN PATENT DOCUMENTS

| | | |
|---|---|---|
| JP | 2000140417 A | 5/2000 |
| JP | 2009240498 A | 10/2009 |
| JP | 2010082335 A | 4/2010 |
| JP | 2017047088 A | 3/2017 |
| KR | 20090116510 A | 11/2009 |

OTHER PUBLICATIONS

"The skills analysis of No. 13 boss Archimonde of the Hellfire Fortress in Warcraft 6.2" found in the Internet at http://w.163.com/15/0417/09/AND5KSO000314C3U.html "Ultimate War: the Detailed Raiders of the Final Boss Archimonde" found in the Internet at http://m.wow.tgbus.com/arc/13715904.shtml.
"First Skilling of the World Archimonde" found in the Internet at https://v.youku.com/v_show/id_XMTI5NTk3NDA5Ng==.html "Raiders of the Epic Archimonde: Hidden Stage Bloodthirsty and Timeline" found in the Internet at http://wow.17173.com/content/2015-09-10/20150910102833881_1.shtml.
The 1st OA of 201710817315.9 issued by CNIPA dated Aug. 13, 2018.
The 1st OA of 201710818304.2 issued by CNIPA dated Aug. 6, 2018.
Life is an FPS game. Sometimes philosophy.
FPS beginner course. BF1 spot importance and tips when you can't.
The JP1OA dated Nov. 5, 2019 by the JPO.
The JPNOA dated Apr. 28, 2020 by the JPO.

* cited by examiner

Now the player faces southeast 252

INFORMATION PROCESSING METHOD, APPARATUS AND COMPUTER READABLE STORAGE MEDIUM

CROSS REFERENCE

This application is based upon and claims priority to Chinese Patent Application No 201710817315.9, filed on Sep. 12, 2017, and Chinese Patent Application No. 201710818304.2, filed on Sep. 12, 2017, the entire contents thereof are incorporated herein by reference.

TECHNICAL FIELD

The present disclosure relates to the field of game technologies, and more particularly, to an information processing method, apparatus and a computer readable storage medium.

BACKGROUND

In the current popular battle royale games, many players may team up against other teams. After the game starts, the players collect game weapons and props in the game scene to fight and eliminate other teams, so as to win the game finally. Different from conventional shooting games, the battle royale game has the process of collecting weapons, accumulating growth, and hide and sneak attacks, which makes game experience full of tension and excitement.

In a team mode of the battle royale game, the major experience is to hide oneself and find the enemies in the game scene, and the main factor to examine the combat skills of the player is whether the player can find locations of the enemies and shoot the enemies in a wide scene. Therefore, in the team mode, it is very important for teammates to communicate with each other, which increases the interaction among the teammates. On one hand, the team experience of the game is further improved; on the other hand, the intercommunication of information among the teammates is more effectively, and it is easier to cooperate with the teammates to kill the enemies.

Figure 1:
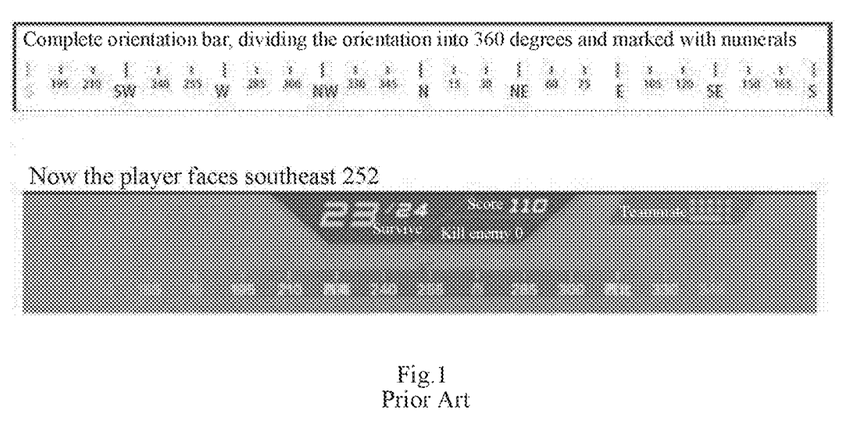
FIG. 1 is a schematic diagram of a scheme for displaying orientation information in an existing battle royale game.

In the current games, the positions of enemies are mainly communicated by notifying orientations via voice, which has certain difficulties and errors. Taking the PC game "Player unknown's Battlegrounds" as an example, as shown in FIG. 1, an orientation bar is placed at the top of the interface, in which a normal north N is recorded as 0, and a scale of 360 degrees are set in sequence with a clockwise direction. An arrow is set on the orientation bar for pointing the current orientation of a virtual character controlled by player (for example, the orientation arrow is pointing to 252, indicating that the orientation of the virtual character is southwest 252); when the virtual character turns around without movement to change the orientation, the orientation bar is scrolled, and the scale pointed by the arrow will be changed. The virtual character of the player turns to an orientation with an angle to observe the surroundings. When an enemy is found just locating in the front of the player, then the player broadcasts the current orientation through the voice via a microphone to tell the teammates the position of the enemy relative to himself/herself. Based on the information, the search scope of the enemies in the wide game scene is narrowed for the teammates.

SUMMARY

An embodiment of the present disclosure discloses an information processing method for controlling transmission and presentation of interaction information between game terminals, wherein a content presented by a graphical user interface of the game terminal includes at least part of game scene and a mini-map, and the method includes: acquiring a position information of a first virtual character in the game scene, by a first game terminal, and determining a direction information according to a preset direction determination rule; sending, by the first game terminal, the position information and the direction information to a second game terminal, generating a graphical positioning mark in the mini-map on the graphical user interlace of the second game terminal according to the position information and the direction information, wherein the graphical positioning mark comprises a position indicator for indicating the position information and a direction indicator for indicating the direction information.

Another embodiment of the present disclosure discloses an information processing method for controlling transmission and presentation of interaction information between game terminals, wherein a content presented by a graphical user interface of the game terminal includes at least part of game scene and a mini-map, and the method includes: acquiring a position information of a first virtual character in the game scene, and determining a direction information according to a preset direction determination rule; and sending the position information and the direction information to other game terminal.

Another embodiment of the present disclosure further discloses an information processing method for controlling transmission and presentation of interaction information between game terminals, wherein a content presented by a graphical user interface of the game terminal includes at least part of game scene and a mini-map, and the method includes: receiving an interaction information sent by other game terminal, the interaction information comprising a position information of a first virtual character in the game scene and a direction information determined according to a preset direction determination rule; and generating a graphical positioning mark in the mini-map, wherein the graphical positioning mark comprises a position indicator for indicating a position of the first virtual character in the game scene and a direction indicator for indicating the direction information.

Another embodiment of the present disclosure further discloses a computer readable storage medium storing a computer program thereon, wherein the computer program is executed by a processor to implement the steps of the forgoing information processing method.

Another embodiment of the present disclosure further discloses an information processing apparatus for controlling transmission and presentation of interaction information between game terminals, wherein a content presented by a graphical user interface of the game terminal includes at least part of game scene and a mini-map, and the apparatus includes a processor; and a memory for storing executable instructions of the processor; wherein the processor is configured to execute the steps of the forgoing information processing method.

DETAILED DESCRIPTION

The present disclosure will be further described hereinafter with reference to the drawings and exemplary embodiments.

The above-mentioned ways of intercommunicating the orientations of the enemies have the following defects: 1) the orientation of the enemy reported by the player (as a broadcaster) is "the orientation of the enemy relative to the position of the virtual character of the player himself/herself (the broadcaster)", and it is easily miscomprehended for the teammates (as receivers) as "the orientation of the enemy relative to the position of my (the receiver's) virtual character", in actual games, the positions of the virtual characters controlled by the teammates may be dispersed in game scene, and there is an error in the relative orientation of the enemy, the closer the enemy is and the farther the ally character is, the greater the error is; 2) it is difficult to determine the voice of the player and the corresponding marks on the map; in a 3D scene, it is difficult for the player to capture the positions of all ally characters, and he/she needs to rely on the map to confirm the surrounding ally characters; when the player realizes that the orientation of the enemy is related to the position of the virtual character controlled by the broadcaster, the player may go to find the virtual character controlled by the broadcaster on the map, however, the players are not personalized and distinguished on the map, so it is difficult to identify who is the broadcaster; 3) the sound information is extremely short-lived, and just recognizing who was broadcasting, the player may not remember what the broadcaster said, and the sound information is easily covered by surrounding environment sounds and attack sounds, which affects the player to receive information from the teammates; and 4) each broadcast message is relatively independent. The information of a plurality of teammates broadcasting information has no obvious differences for the player, it lacks the cumulative effects of the information, and there is no space for cooperation and communication, so that the orientation of the enemy cannot be effectively communicated.

The present disclosure mainly aims at proposing an information processing method for controlling transmission and presentation of interaction information between game terminals to realize game information interaction between different game terminals, especially fast visual interaction and sharing of the orientation information of the enemy, so as to overcome the above-mentioned defects of the related art.

The detailed description of the present disclosure discloses an information processing method for controlling transmission and presentation of interaction information between game terminals, wherein a content presented by a graphical user interface of the game terminal includes at least part of game scene and a mini-map. The game terminal is, for example, a mobile phone, a tablet, a notebook computer, a desktop computer, a smart game machine, and the like, and is not limited to this. The mini-map is a small map arranged at a certain region on the game interface (for example, an upper right corner or an upper left corner of the interface, etc.) The mini-map is generally a 2D map, which may either present the entire game scene, or just a part of the game scene. Different details in different types of games may be displayed in the mini-map, for example, information such as map details, to assist the players to determine their positions in the game scene, real-time positions of ally characters, real-time positions of enemies, and a current visual area, or the like.

The information processing method provided by an embodiment includes: acquiring a position information of a first virtual character in the game scene, by a first game terminal, and determining a direction information according to a preset direction determination rule, sending, by the first game terminal, the position information and the direction information to a second game terminal; and generating a graphical positioning mark in the mini-map on the graphical user interface of the second game terminal according to the position information and the direction information, wherein the graphical positioning mark comprises a position indicator for indicating the position information and a direction indicator for indicating the direction information.

The first virtual character is a player-controlled character of a first game terminal it may be understood that the position indicator is used to display a real-time position of the first virtual character in the game scene. The virtual character refers to a game character manipulated by the player, and is displayed on the graphical user interface rendered by the mobile phone in a partial or overall form of the game character. For example, in a first person perspective, the content of the graphical user interface is displayed by a master perspective of the player, which enhances the immersive experience of the player, and only a part of the game character, such as a hand or foot, may be seen in the interface; while in a third-person perspective, the game character may be presented on the graphical user interface as a whole, which reduces the manipulation difficulty and dizziness of the player, and emphasizes the visual sense of movement. The developer or player may select the detailed display manner according to the game contents or hobbies, which will not be limited in the present disclosure.

In an exemplary embodiment, the determining the direction information according to the preset direction determination rule includes: determining a virtual target in the game scene according to an input of the player, and determining the direction information according to a connection line between the first virtual character and a virtual target. The virtual target may be any model or position in the game scene, and may be set according to a specific application environment of the game, for example, the virtual target may be a virtual character controlled by the enemy, and the direction information in this case represents the orientation of the enemy.

In another exemplary embodiment, the determining the direction information according to the preset direction determination rule includes: providing a crosshair on the graphical user interface and controlling a position of the crosshair in the game scene according to the input of the player, and determining the direction information according to a connection line between the first virtual character and the crosshair. The crosshair is generally used to aim at the enemy. When the first virtual character finds the virtual target controlled by the enemy player, the position of the crosshair is adjusted to be aligned with the virtual target. At this time, the connection line between the first virtual character and the crosshair may represent the orientation information of the virtual target.

Figure 6:
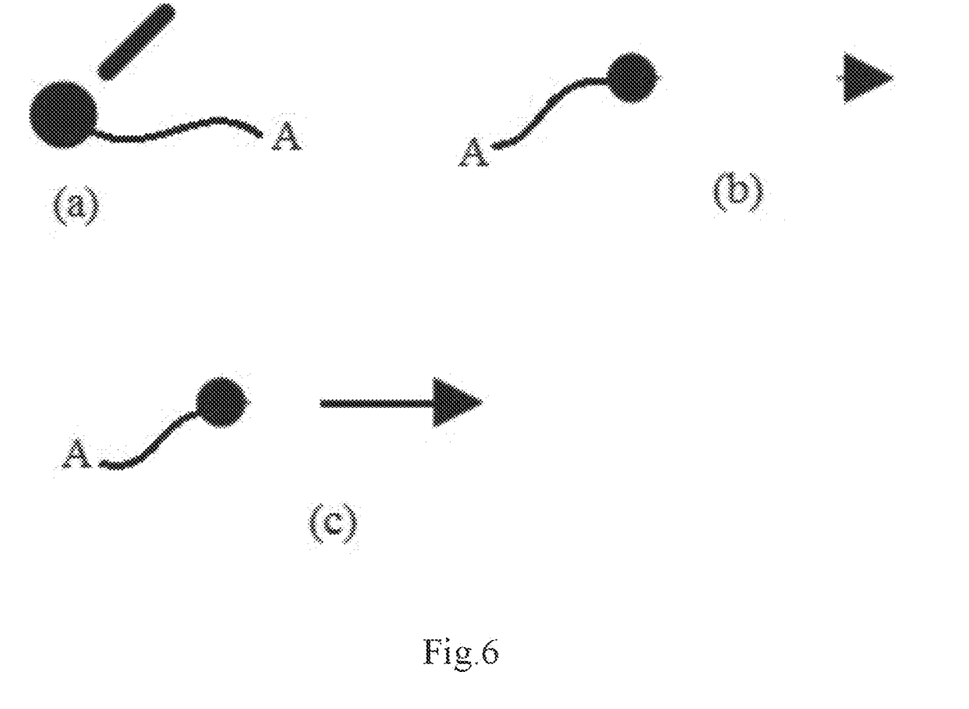
FIG. 6 is a schematic diagram of another three exemplary of the enemy orientation marks.

In some specific embodiments, the direction indicator is attached to the position indicator. That is, the relative display positions of the direction indicator and the position indicator displayed in the mini-map are remained to be fixed, and when the position of the position indicator in the mini-map is determined, the position of the direction indicator in the mini-map on the graphical user interface is also determined accordingly. For example, the direction indicator and the position indicator may be directly connected, the direction indicator is a segment, and an end point of the segment is just the position of the position indicator. In some specific embodiments, the direction indicator may be set in the position with a distance from the position indicator being less than a preset threshold. The preset threshold may be set according to an application environment of the game, and is aiming to make the direction indicator and the position indicator visually associated with each other, so as to facilitate the player to observe such indicators. For example, a position indicator of the first virtual character in the mini-map is a small dot A, while the direction indicator is in a position has a relatively short distance (may be less than a preset threshold, such as 0 to 200 pixels) from the small dot A. The direction indicator, for example, as shown in FIG. 6, may be a segment, an arrow or a segment with an arrow, etc., and the direction information is indicated by a direction of the segment or a pointing direction of the arrow. In some example embodiments, the direction indicator includes distance indication information, for example, the direction indicator is a segment with the position of the position indicator as an end point, and a length of the segment may be used as the distance indication information, in an exemplary embodiment, the distance indication information is used to represent a sight distance of the first virtual character in the game scene. In a game for simulating a real scene, the player cannot accurately know the precise positions of other virtual targets (such as enemy characters). After the distance indication information is set in the direction indicator, the orientation of the enemy relative to the first virtual character may be informed to other players (such as teammates) on one hand, and a scope (the scope may be a preset scope that may be displayed on a screen, or a scope determined according to a preset algorithm, such as the sight distance of the first virtual character in the game scene, i.e., farthest visual range of the first virtual character) may be indicated through the distance indication information, so that a scope (which is not the precise position of the enemy unit in the game scene, thereby avoiding the difficulty of the game and the fun of the game are further reduced) of an enemy unit located in the game scene is informed to other players.

In an example, a signal transmitting control may be provided on the graphical user interface of the first game terminal, specifically in the game scene. When a triggering operation of the player on the signal transmitting control is detected, i.e., an interaction information sending condition is met, the first game terminal transmits the position information and the direction information to a second game terminal. It should be noted that the foregoing interaction between the first game terminal and the second game terminal may be one-to-one interaction, or may be one-to-multiple or multiple-to-one interaction, i.e., the first game terminal may transmit the interaction information to a plurality of second game terminals, and the second game terminal may receive the interaction information transmitted by a plurality of first terminals at the same time, for example: each player in the same team may simultaneously transmit the interaction information to other players (teammates) in the team, i.e., the first game terminal may simultaneously transmit the interaction information to other terminals, and simultaneously receive the interaction information transmitted by other game terminals.

The foregoing information processing method provided by the present disclosure will be described in more detail below with a specific application example.

For example, in a battle royale game, a plurality of players are merged to a battle team, and the plurality of players respectively control a plurality of corresponding game terminals. It is assumed that a virtual character controlled by a player operating the first game terminal is defined as A, then a small dot, for example, in the mini-map may be used as a position indicator of the virtual character A, and the virtual character moves in the game scene, then the corresponding small dot moves in the mini-map to display a real-time position of the virtual character. When the player controls the virtual character A to move in the game scene and finds a virtual target D (referring to an enemy in the example), the player controlling the first game terminal may trigger a signal transmitting control on the game interface (for example, clicking a signal transmitting button or the like) to transmit the position information thereof and direction information capable of indicating the orientation of the virtual target D to the remaining game terminals (i.e., the second game terminal) in the same team. Specifically, the first game terminal receives a trigger signal, and generates a graphical positioning mark on the mini-map according to the position indicator of the virtual character A and the direction information indicating the orientation of the virtual target D. For example, a segment with the position of the virtual character A as an end point is generated on the mini-map, and is pointing to the virtual target D, and a length of the segment may be set as equal to the sight distance of the virtual character A. According to such graphical positioning mark, the orientation information of the enemy is present on the mini-map. Subsequently, after receiving the position information and the direction information, the corresponding graphical positioning marks in the mini-map are rendered on the graphical user interface of the remaining game terminals of the same team, and the position of the virtual character A, the direction of the found virtual target D (enemy) relative to the virtual character A, and an approximate distance scope of the virtual target D are present to the teammate players of the virtual character A, then the remaining players could control the respective virtual characters in the game to departure and find the virtual target according to graphical positioning marks.

Figure 2:
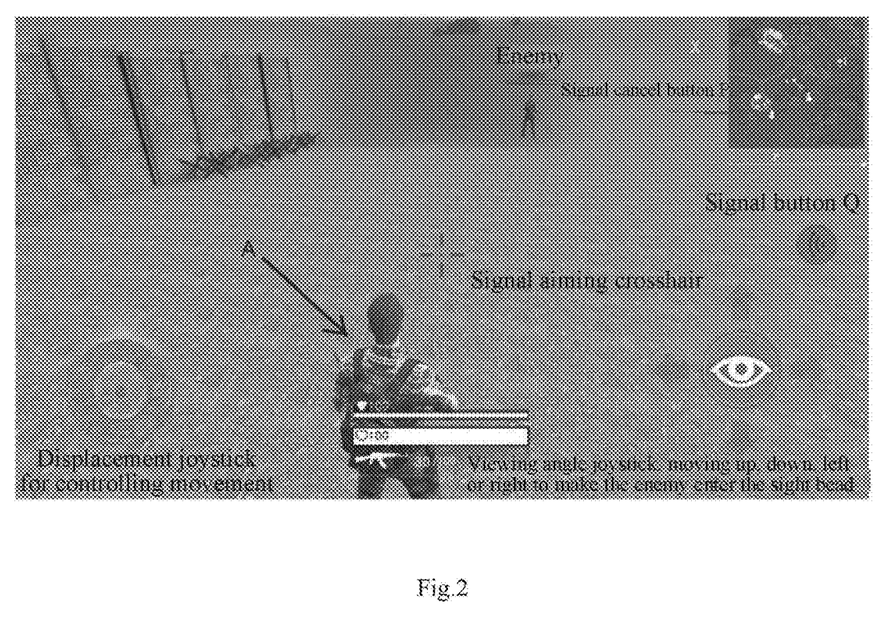
FIG. 2 is an exemplary game interface diagram of a method for locating and marking a target point provided by an embodiment of the present disclosure.
Figure 3:
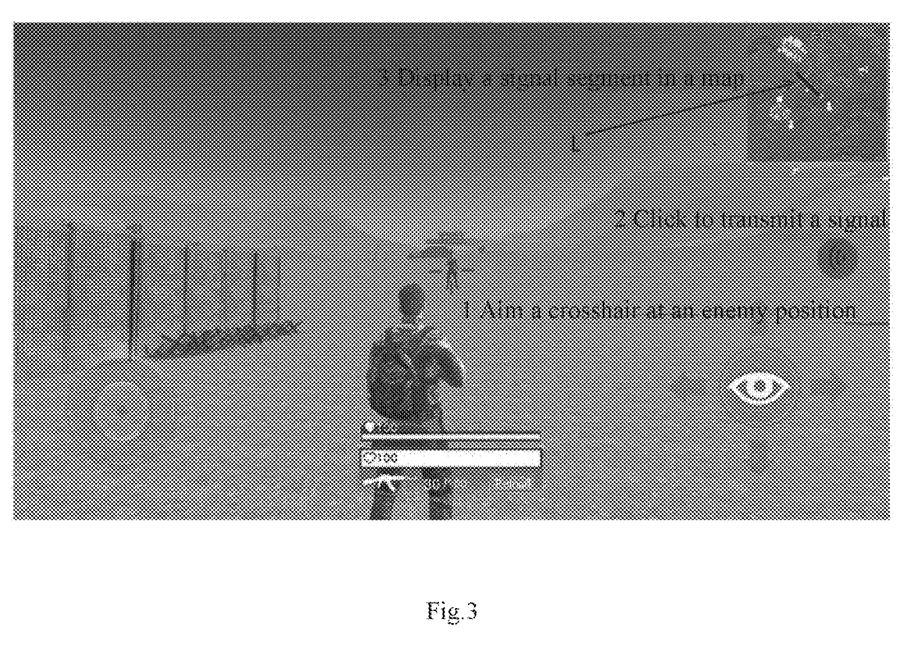
FIG. 3 is a schematic diagram of a player of the game interface shown in FIG. 2 aiming and positioning an enemy and marking an orientation of the enemy by aiming with a crosshair.
Figure 4:
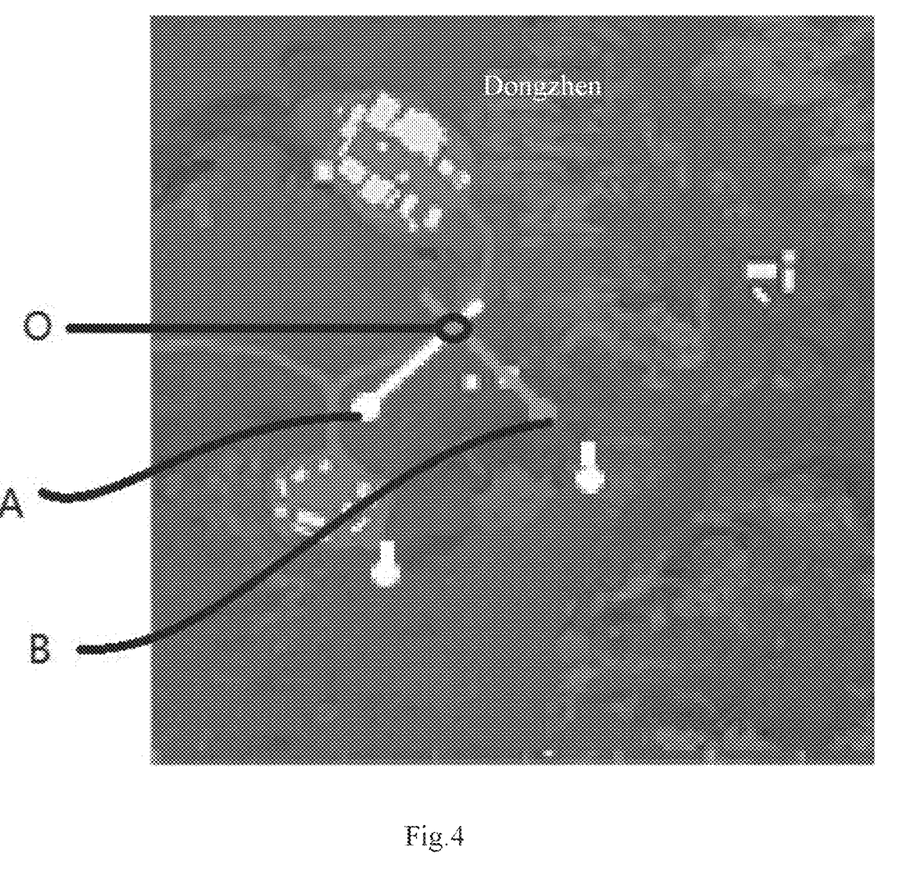
FIG. 4 is a schematic diagram of a segment type of the enemy orientation mark.

In an exemplary scheme, a crosshair (sight bead) may be provided on the graphical user interface, and the direction information is determined according to a position of the first virtual character and a position of the crosshair, wherein the position of the crosshair in the game scene is controlled by the player, and is used for aiming the virtual target in the game scene. For example, the position in the game scene aimed by the crosshair is adjusted by a viewing angle joystick, or the position in the game scene aimed by the crosshair is adjusted by providing a preset touch region on the graphical user interface and acquiring a sliding operation of the player in the preset touch region. The present disclosure is not limited thereto. When the player finds an enemy D (i.e., the virtual target D) in the field of view, the crosshair may be moved to a character mode) of the enemy D, so that the enemy D, the crosshair and the virtual character A are positioned in a straight line on the game interface, to finish aiming, and determine the direction information according to the connection line between the virtual character A and the crosshair. For example, as shown in FIG. 2 to FIG. 4, an enemy orientation mark (that is the graphical positioning mark in the present disclosure) is generated on a 2D mini-map according to the position information of the virtual character A and the determined direction information. The enemy orientation mark is, for example, a segment with the position of the virtual character A as an end point, and passing through the crosshair and/or the enemy D, and a length of the segment is the sight distance of the virtual character A.

In an example, the crosshair presented on each player's terminal is always located in a sight scope (whose radius may be set as the sight distance) in the front of the virtual character. In an example, the shape of the graphical user interface (game interface) is a square or rectangle, while the virtual character controlled by a player is always displayed in a center of the square or rectangle graphical user interface regardless of how it moves, and a furthest sight distance of the virtual character is set to be m (i.e., the furthest distance that the virtual character could capture), wherein m≤d/2, and d is a side length of the square or a width of the rectangle. Meanwhile, the movement of the crosshair does not exceed the farthest sight distance m of the virtual character to which it belongs. In some other embodiments, the crosshair does not move relative to the virtual character controlled by the player, i.e., both orientation and distance of the crosshair and the virtual character are fixed. To be specific, the virtual character moves synchronously when the crosshair is moved, or when the virtual character moves, the crosshair is moved synchronously, so that the crosshair could always be stay directly ahead of the virtual character with a fixed distance.

In another example, on the mini-map located in the graphical user interface (generally in an upper right corner, which is not limited herein), a coordinate point of the virtual character controlled by the player in the game scene is always located at a center of the mini-map. A shape of the mini-map is generally a square occupying a relatively small area of the graphical user interface, and may also be a rectangle, a circle, or the like. Regardless of the shape, it should be ensured that the farthest sight distance of the virtual character does not exceed a boundary of the mini-map.

In a specific embodiment, referring to FIG. 2, a viewing angle joystick for controlling the position of crosshair at least includes upper, lower, left, and right orientation adjusting buttons (shown by four orientation arrows in the figure). When the virtual character A controlled by a player finds an enemy in the game scene, the position of the crosshair may be adjusted through the operation on the viewing angle joystick at the lower right of the interface.

In another exemplary embodiment, as shown in FIG. 2, when the virtual character A finds an enemy in the game scene, the crosshair is firstly moved to align with the character model of an enemy by the operation on the viewing angle joystick, to finish aiming and positioning, i.e. a state shown in FIG. 3, then, the position information of the virtual character A and the direction information of the crosshair is sent by triggering a User Interface (UI) control. A graphical positioning mark is generated on the graphical user interface of a receiving terminal according to the received interaction information, i.e., the graphical positioning mark is generated on a 2D mini-map. In this way, the player's for controlling the virtual character A and the teammate for controlling the ally characters could see the mark on the mini-map, so that the ally characters could be controlled to immediately turn, move, and search for the enemy based on the mark. As shown in FIG. 2, in an example, a first UI control may be, for example, a signal button Q obviously provided on the graphical user interface for the player to click, and then a mark is corresponding generated.

As shown in FIG. 2 to FIG. 4, in one embodiment, the generated graphical positioning mark may be a segment L, and the segment L passes through at least the virtual character A, the enemy, and the crosshair (also equivalent to passing through the enemy-model), and is at least located within the sight distance of the virtual character A. In an example, an end point of the segment L is the position of the virtual character A, the segment L passes through the crosshair and the enemy, and a length of the segment L is equal to the sight distance m of the virtual character A The search scope of enemies may be further reduced by this manner. Since the 2D mini-map has a small scale, the mark segment should be as slim as possible in premise that it can be identified, and in an example, mark segments made by different players may be set in different colors to facilitate differentiation. As shown in FIG. 4, when the mark segments transmitted by two terminals of the same team have an intersection, it has a high probability that the position of the intersection O is indicated to the position of the same enemy, then the teammates of the team to which the virtual characters. A and B belong could perform an operation such as attracting from both sides to kill the enemy-according to the actual situations.

Figure 5:
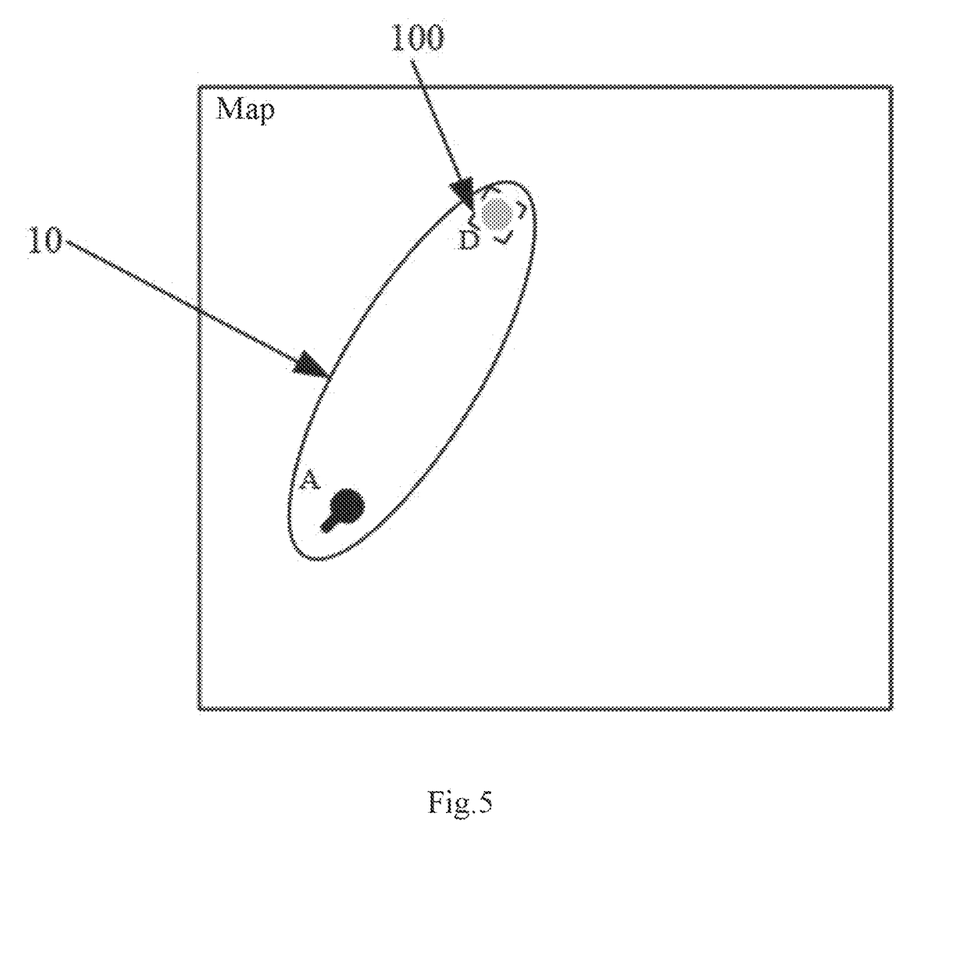
FIG. 5 is a schematic diagram of a region type of the enemy orientation mark.

As shown in FIG. 5, in another embodiment, the generated graphical positioning mark for indicating a scope of the enemy position may be a closed region 10, and a shape of the closed region 10 is not limited (for example, a circle, an ellipse, a square, a rectangle, etc.). In an example, there is a directional closed region, i.e.; the closed region may be a non-centrosymmetric graph, thus being capable of indicating directions by an orientation of the graph, or, the closed region may be a centrosymmetric graph with a direction indication to indicate the direction, and a scope of the closed region is presented as the distance indication information Therefore, the closed region at least covers the position of the enemy D aimed by the crosshair 100, and may further include the virtual character A and/or the crosshair 100. In an example, the virtual character A may be placed on a boundary of the closed region. Regardless of the shape, a farthest position of the closed region from the virtual character A should be in the sight distance of the virtual character A. Similarly, when the closed regions marked by two teammates are overlapped, the enemy is likely located in the overlapped region, i.e., cooperation of two or more teammates could further narrow the search scope.

In some embodiments, the method further includes; changing visual representation of the graphical positioning mark according to a generation time of the graphical positioning mark. That is, a timeliness may be set for the graphical positioning mark to change the visual representation effects of the graphical positioning mark according to the change of time. In an exemplary embodiment, an opacity of the graphical positioning mark is reduced with an increase of the generation time of the graphical positioning mark. For example, the opacity is 100% in 0 to 8 seconds after the mark is transmitted, and the opacity is reduced to 30% in 30 seconds, then the player may rely on the opacity of the mark to determine the "recency (new or old degree)" of the mark. The higher the opacity is, the stronger the immediacy is, and the higher the dependability is; conversely, a more transparent mark indicates that the mark has been generated for a certain time, and the enemy related to the mark has already changed the position in the game scene or has been killed, and the player may selectively trust these more transparent marks. In an exemplary embodiment, the method further includes: cancelling the graphical positioning mark when the generation time of the graphical positioning mark reaches a preset time threshold, so as to avoid useless marks (the marks are useless when the enemy has been killed or the position thereof has changed) from misleading the teammates. In an exemplary embodiment, the method further includes, providing a cancel control on the graphical user interface, and cancelling the graphical positioning mark when a triggering operation on the cancel control is detected. On the graphical user interface, a second UI control is also provided in the exemplar) embodiment, which may be used by the player to cancel the useless or/and wrong marks. As shown in FIG. 2, the second UI control may be, for example, a signal cancel button P located in the game interface. If the marked enemy has been killed or the position thereof has changed greatly, a corresponding mark may be selected and then the mark may be cancelled by clicking the button P.

In some other schemes, when the segment made by the player controlling the virtual character A does not intersect with any segment from the other teammates, a pop-up prompt information may be provided on the interface, for example, "Attention please! There is a big difference to the signal from the teammates!", but this does not mean that the segment made by the player is wrong, and the pop-up prompt information is just served as a reminder.

Another embodiment of the present disclosure discloses an information processing method for controlling transmission and presentation of interaction information between game terminals, wherein a content presented by a graphical user interface of the game terminal comprises at least part of game scene and a mini-map, and the method includes: acquiring a position information of a first virtual character in the game scene, and determining a direction information according to a preset direction determination rule; and sending the position information and the direction information to other game terminal.

In this embodiment, the interaction process of the information processing method of the present disclosure is demonstrated by the mobile phone that manipulates the first virtual character and sends the interaction information, by acquiring position information of a first virtual character in the game scene and determining direction information according to a preset direction determination rule, and sending the position information and the direction information to a mobile phone(s) of other teammate(s) in the game when a certain condition is satisfied, the enemy's position can be notified to the teammates in the game in real time. Other specific contents of the embodiment have been described in detail in the above embodiments, which will not be repeated herein.

Another embodiment of the present disclosure further discloses an information processing method for controlling transmission and presentation of interaction information between game terminals, wherein a content presented by a graphical user interface of the game terminal includes at least part of game scene and a mini-map, and the method includes: receiving an interaction information sent by other game terminal, the interaction information comprising a position information of a first virtual character in the game scene and a direction information determined according to a preset direction determination rule; and generating a graphical positioning mark in the mini-map, wherein the graphical positioning mark comprises a position indicator for indicating a position of the first virtual character in the game scene and a direction indicator for indicating the direction information.

In this embodiment, the interaction process of the information processing method of the present disclosure is demonstrated by the mobile phone receiving the interaction information, by receiving the position information in the game scene of the first virtual character sent by the teammate who manipulates the first virtual character, determining direction information according to a preset direction determining rule, and displaying a corresponding position indicator and a direction indicator on the mini-map on the screen of the mobile phone receiving the interactive information, the notification of the position of the enemy sent by the teammate is received in the game. Other specific contents of the embodiment have been described in detail in the above embodiments, which will not be repeated herein.

Another embodiment of the present disclosure discloses an information processing apparatus for controlling transmission and presentation of interaction information between game terminals, wherein a content presented by a graphical user interface of the game terminal comprises at least part of game scene and a mini-map, and the apparatus includes: a direction determining program configured to acquire a position information of a first virtual character in the game scene and determine direction information according to a preset direction determination rule, an information sending program configured to control the first game terminal to send the position information and the direction information to a second game terminal, and a mark generating program configured to generate a graphic positioning mark in the mini-map on a graphical user interface of the second game terminal according to the position information and the direction information, wherein the graphic positioning mark includes a position indicator for indicating the position information and a direction indicator for indicating the direction information.

Another embodiment of the present disclosure discloses an information processing apparatus for controlling transmission and presentation of interaction information between game terminals, wherein a content presented by a graphical user interface of the game terminal includes at least of game scene and a mini-map, the apparatus including: a direction determining program configured to acquire a position information of a first virtual character in the game scene, and determine direction information according to a preset direction determination rule, and an information sending program configured to send the position information and the direction information to other game terminal.

In this embodiment, the apparatus is used to control an information interaction process between the first game terminal and other game terminal, and the first game terminal is a mobile phone that manipulates the first virtual character. By acquiring position information of a first virtual character in the game scene and determining direction information according to a preset direction determination rule, and sending the position information and the direction information to mobile phones of other teammates in the game when a certain condition is satisfied, the enemy's position can be notified to the teammates in the game in real time. Other specific contents of the embodiment have been described in detail in the above embodiments, which will not be repeated herein.

Another embodiment of the present disclosure discloses an information processing apparatus, for controlling transmission and presentation of interaction information between game terminals, wherein a content presented by a graphical user interface of the game terminal includes at least pan of game scene and a mini-map, the apparatus including: an information receiving program configured to receive interaction information sent by other game terminal, the interaction information including a position information of a first virtual character in the game scene and a direction information determined according to a preset direction determination rule; and a mark generation program configured to generate a graphic positioning mark in the mini-map, wherein the graphic positioning mark includes a position indicator for indicating a position of the first virtual character in the game scene and a direction indicator for indicating the direction information.

In the present embodiment, the apparatus is an information processing procedure for controlling a game terminal that receives interactive information By receiving the position information in the game scene of the first virtual character sent by the teammate who manipulates the first virtual character, determining direction information according to a preset direction determining rule, and displaying a corresponding position indicator and a direction indicator on the mini-map on the screen of the mobile phone receiving the interactive information, the notification of the position of the enemy sent by the teammate is received in the game. Other specific contents of the embodiment have been described in detail in the above embodiments, which will not be repeated herein.

Another embodiment of the present disclosure further discloses a computer readable storage medium storing a computer program thereon, wherein the computer program is executed by a processor to implement the steps of the forgoing information processing method in the forgoing embodiments.

The computer readable storage medium may include a data signal that is propagated in a baseband or as part of a carrier, in which a readable program code is carried. Such propagated data signal can take a variety of forms including, but not limited to, an electromagnetic signal, an optical signal, or any suitable combination of the foregoing. The computer readable storage medium can transmit, propagate, or send a program for use by or in connection with an instruction execution system, apparatus, or device.

The program code included in the computer readable storage medium may be transmitted by any suitable medium, including but not limited to wireless, wire, optical cable, radio frequency, etc. or any suitable combination of the foregoing.

The foregoing information processing method and apparatus of the present disclosure may be applied to games (especially 3D games) at a mobile phone, a PC end, etc., to achieve rapid positioning when a target enemy is found and to perform local position sharing within the team in a visual marking manner, so as to improve the game team experience.

The foregoing are further detailed descriptions of the present disclosure with reference to the specific embodiments, and it should not be considered that the concrete implementation of the present disclosure is merely limited to these descriptions. For those of ordinary skills in the art, some equivalent substitutions or apparent modifications with same performances or applications can be made without departing from the concept of the invention, which shall all be included within the protection scope of the present disclosure.

What is claimed is:

1. An information processing method for controlling transmission and presentation of interaction information between game terminals, wherein a content presented by a graphical user interface of the game terminal comprises at least part of game scene and a mini-map, and the method comprises:

acquiring a position information of a first virtual character in the game scene, by a first game terminal, and determining a direction information according to a preset direction determination rule;

sending, by the first game terminal, the position information and the direction information to a second game terminal; and generating a graphical positioning mark in the mini-map on the graphical user interface of the second game terminal according to the position information and the direction information, wherein the graphical positioning mark comprises a position indicator for indicating the position information and a direction indicator for indicating the direction information, wherein the method further comprises: changing visual representation of the graphical positioning mark according to a generation time of the graphical positioning mark; and cancelling the graphical positioning mark when the generation time of the graphical positioning mark reaches a preset time threshold.

2. The method according to claim 1, wherein the direction indicator is attached to the position indicator.

3. The method according to claim 1, wherein the direction indicator comprises a distance indication information.

4. The method according to claim 3, wherein the direction indicator is a segment, and an end point of the segment is a position of the position indicator, an orientation of the segment is corresponding to the direction information, and a length of the segment is related to the distance indication information; or the direction indicator is a closed region with a direction indication, and the distance indication information is corresponding to a scope of the closed region.

5. The method according to claim 3, wherein the distance indication information comprises a sight distance of the first virtual character in the game scene.

6. The method according to claim 1, wherein the step of determining the direction information according to the preset direction determination rule comprises:

acquiring a virtual target in the game scene, and determining the direction information according to a position of the first virtual character and a position of the virtual target.

7. The method according to claim 1, wherein the determining the direction information according to the preset direction determination rule comprises:

providing a crosshair on the graphical user interface, and determining the direction information according to a position of the first virtual character and a position of the crosshair, wherein the crosshair is used for aiming the virtual target in the game scene.

8. The method according to claim 1, wherein the step of sending, by the first game terminal, the position information and the direction information to the second game terminal comprises:

providing a signal sending control on the graphical user interface of the first game terminal, and when a triggering operation on the signal sending control is detected, sending the position information and direction information to the second game terminal by the first game terminal.

9. The method according to claim 1, wherein the first virtual character is a game character controlled by the first game terminal.

10. The method according to claim 1, wherein an opacity of the graphical positioning mark is reduced with an increase of the generation time of the graphical positioning mark.

11. The method according to claim 1, further comprising: providing a cancel control on the graphical user interface, and cancelling the graphical positioning mark when a triggering operation on the cancel control is detected.

12. An information processing method for controlling transmission and presentation of interaction information between game terminals, wherein a content presented by a graphical user interface of the game terminal comprises at least part of game scene and a mini-map, and the method comprises:
   acquiring a position information of a first virtual character in the game scene, and determining a direction information according to a preset direction determination rule;
   sending the position information and the direction information to other game terminal; and
   generating a graphical positioning mark in the mini-map on the graphical user interface, wherein the graphical positioning mark comprises a position indicator for indicating the position information and a direction indicator for indicating the direction information,
   wherein the method further comprises: changing visual representation of the graphical positioning mark according to a generation time of the graphical positioning mark; and
   cancelling the graphical positioning mark when the generation time of the graphical positioning mark reaches a preset time threshold.

13. The method according to claim 12, wherein the step of determining the direction information according to the preset direction determination rule comprises:
   acquiring a virtual target in the game scene, and determining the direction information according to a position of the first virtual character and a position of the virtual target.

14. The method according to claim 12, wherein the determining the direction information according to the preset direction determination rule comprises:
   providing a crosshair on the graphical user interface, and determining the direction information according to a position of the first virtual character and a position of the crosshair, wherein the crosshair is used for aiming the virtual target in the game scene.

15. The method according to claim 12, wherein the step of sending the position information and the direction information to other game terminal comprises:
   providing a signal sending control on the graphical user interface of the game terminal, and when a triggering operation on the signal sending control is detected, sending the position information and direction information to other game terminal.

16. The method according to claim 12, wherein the direction indicator is attached to the position indicator.

17. The method according to claim 12, wherein the direction indicator comprises a distance indication information.

18. The method according to claim 17, wherein the direction indicator is a segment, and an end point of the segment is a position of the position indicator, an orientation of the segment is corresponding to the direction information, and a length of the segment is related to the distance indication information; or
   the direction indicator is a closed region with a direction indication, and the distance indication information is corresponding to a scope of the closed region.

19. The method according to claim 17, wherein the distance indication information comprises a sight distance of the first virtual character in the game scene.

20. The method according to claim 12, wherein an opacity of the graphical positioning mark is reduced with an increase of the generation time of the graphical positioning mark.

21. The method according to claim 12, further comprising: providing a cancel control on the graphical user interface, and cancelling the graphical positioning mark when a triggering operation on the cancel control is detected.

22. An information processing method for controlling transmission and presentation of interaction information between game terminals, wherein a content presented by a graphical user interface of the game terminal comprises at least part of game scene and a mini-map, and the method comprises:
   receiving an interaction information sent by other game terminal, the interaction information comprising a position information of a first virtual character in the game scene and a direction information determined according to a preset direction determination rule; and
   generating a graphical positioning mark in the mini-map, wherein the graphical positioning mark comprises a position indicator for indicating a position of the first virtual character in the game scene and a direction indicator for indicating the direction information,
   wherein the method further comprises: changing visual representation of the graphical positioning mark according to a generation time of the graphical positioning mark; and
   cancelling the graphical positioning mark when the generation time of the graphical positioning mark reaches a preset time threshold.

23. The method according to claim 22, wherein the direction indicator is attached to the position indicator.

24. The method according to claim 22, wherein the direction indicator comprises a distance indication information.

25. The method according to claim 22, wherein the direction indicator is a segment, and an end point of the segment is a position of the position indicator, an orientation of the segment is corresponding to the direction information, and a length of the segment is related to the distance indication information; or
   the direction indicator is a closed region with a direction indication, and the distance indication information is corresponding to a scope of the closed region.

26. The method according to claim 22, wherein the distance indication information comprises a sight distance of the first virtual character in the game scene.

27. The method according to claim 22, wherein an opacity of the graphical positioning mark is reduced with an increase of the generation time of the graphical positioning mark.

* * * * *